United States Patent
Saneshige

Patent Number: 6,082,903
Date of Patent: Jul. 4, 2000

[54] BEARING DEVICE COMPRISING A SLIDE MEMBER, AND A HOLDING MEMBER BOTH MADE OF POROUS SINTERED METAL IMPREGNATED WITH LUBRICATING OIL

[75] Inventor: Ryoji Saneshige, Yonago, Japan

[73] Assignee: Matsushita Electric Industrial Co., Ltd., Osaka, Japan

[21] Appl. No.: 09/184,228

[22] Filed: Nov. 2, 1998

[30] Foreign Application Priority Data

Nov. 25, 1997 [JP] Japan ................................ 9-322599

[51] Int. Cl.[7] ............................................ F16L 33/10
[52] U.S. Cl. .................................... 384/279; 384/902
[58] Field of Search ............................... 384/279, 902, 384/114, 120

[56] References Cited

U.S. PATENT DOCUMENTS

| | | | |
|---|---|---|---|
| 4,093,323 | 6/1978 | Quandt et al. ................. | 384/279 X |
| 5,120,140 | 6/1992 | Nakagawa et al. ............. | 384/279 |
| 5,145,266 | 9/1992 | Sanesige et al. ............... | 384/279 |
| 5,281,035 | 1/1994 | Lo ................................. | 384/279 |
| 5,282,688 | 2/1994 | Kanezaki et al. .............. | 384/279 |
| 5,490,730 | 2/1996 | Akita et al. .................... | 384/279 X |
| 5,645,355 | 7/1997 | Tokushima et al. ............ | 384/279 X |
| 5,647,672 | 7/1997 | Fukutani ........................ | 384/100 |
| 5,704,718 | 1/1998 | Mori et al. ..................... | 384/279 |
| 5,746,516 | 5/1998 | Miyasaka et al. .............. | 384/279 X |
| 5,762,423 | 6/1998 | Mori et al. ..................... | 384/279 |
| 5,810,481 | 9/1998 | Nii et al. ........................ | 384/279 |
| 5,822,846 | 10/1998 | Moritan et al. ................ | 384/115 X |
| 5,880,545 | 3/1999 | Takamura et al. .............. | 384/100 X |
| 5,895,119 | 4/1999 | Miyasaka et al. .............. | 384/279 |
| 5,899,572 | 5/1999 | Strobl ............................ | 384/279 |

FOREIGN PATENT DOCUMENTS 7-243449  9/1995  Japan .

*Primary Examiner*—David A. Bucci
*Assistant Examiner*—Brandon C. Stallman
*Attorney, Agent, or Firm*—Wenderoth, Lind & Ponack, L.L.P.

[57] ABSTRACT

A bearing device includes a slidemember made of porous-sintered-metal for slidably supporting a rotational shaft, and a holding member made of the same porous-sintered-metal and holding the slide member. The two members are constructed of the same material, and yet the density of the slide member is greater than that of the holding member so that lubricating oil is supplied continuously from the holding member to the slide member due to the capillary phenomenon. The bearing device constructed as above prevents the lubricating oil from flowing out, improves abrasion-resistance, and thereby extends the service life. Further, this construction allows the bearing device to be smaller and thinner.

10 Claims, 2 Drawing Sheets

BEARING DEVICE COMPRISING A SLIDE MEMBER, AND A HOLDING MEMBER BOTH MADE OF POROUS SINTERED METAL IMPREGNATED WITH LUBRICATING OIL

FIELD OF THE INVENTION

The present invention relates to bearing devices employed in motors mounted to information storage devices or audio and video apparatuses and the like, and more particularly to a bearing device comprising a slide member and a holding member, both members being made of porous sintered metal impregnated with lubricating oil.

BACKGROUND OF THE INVENTION

Recent wide computer use has entailed a popularity of information storage devices such as disc driving devices, including magnetic disc driving devices and the like. A disc driving device of a height of ⅔ inches or ½ inches, is prevailing among others in the market, because a handy type of computer in an A4 (letter) size employs this type of disc driving device. A spindle motor employed in this disc driving device is naturally required to be small, thin and light weight, because the storage devices are required to be the same. A bearing device supporting a rotational shaft of the motor must thus not only be small and thin, but also stable in rotation and strong against abrasion. It must also have a long life.

Japanese non-examined Patent Application Publication H07-243449 discloses a bearing device that aims to realize stable sliding and stable rotation of the rotational shaft. FIG. 5 is a cross sectional view of this prior art. In FIG. 5, a slide member 1 is cylinder shaped, and a cylindrical shaft-hole is punched through within a rim of the cylinder. The shaft-hole receives a rotational shaft (not shown) and supports it so that the shaft can be rotated in the circumferential direction. The shaft is thus supported rotatively within the slide member 1. The slide member 1 is press fitted into a holding member 2 and fixed thereto.

Diameters of the shaft-hole at a first end 51 and a second end 53 are smaller than that of a center part 52. Both ends 51 and 53 slide with respect to the shaft. A portion 54 of an outer rim of the slide member 1 corresponding to the end 51 of the shaft-hole has a smaller diameter than other parts of the slide member 1.

The slide member 1 is made of sintered metal that is impregnated with lubricating oil, i.e., it forms a sintered metal bearing device. This sintered metal bearing device splashes a little lubricating oil. In general, the life of this bearing device mainly depends on evaporation of the lubricating oil and abrasion due to operation. These factors are found as a function between temperature and time. Accordingly, the quantity of lubricating oil impregnated into the bearing device is a critical factor determining the life of this sintered metal bearing device. A predetermined quantity of the lubricating oil must be impregnated into the sintered metal in order to realize a long product life.

Because the structure of the above conventional bearing device has a limit to the amount of lubricating oil that can be impregnated thereinto, the cubic volume of the slide member 1 must be enlarged to secure the necessary quantity of the lubricating oil in order to ensure the desired life span. As a result, the entire body of the bearing device is obliged to be larger.

Another Japanese unexamined Patent Application Publication H08-9450 discloses a bearing device that prevents lubricating oil from splashing, and thereby prolongs the life of the bearing device.

FIG. 6 is a cross sectional view of this prior art. In FIG. 6, a porous member 62 is disposed axially near an end of a slide member 61 that supports a shaft 63. This porous member 62 prevents the lubricating oil from splashing out axially from a space between the shaft 63 and the slide member 61. This structure is effective to a certain extent to maintain a normal operation by preventing the lubricating oil from splashing; however, because the porous member 62 is disposed axially on end faces, the entire body of the bearing device is obliged to be axially longer. When a certain limit is set on the axial length, this bearing device has a disadvantage. If the axial length of the slide member 61 or the porous member 62 is shortened, the shaft-supporting length becomes shorter. As a result, the rotational accuracy of the shaft and the life of this bearing device are negatively affected.

SUMMARY OF THE INVENTION

The present invention aims to provide a bearing device that can retain a sufficient quantity of lubricating oil in a small body, and continue supplying the lubricating oil to a space between a rotational shaft and a slide member, thereby realizing a long service life.

The bearing device of the present invention comprises the following elements:

(a) a slide member made of porous sintered metal, slidably supporting a rotational shaft, and (b) a holding member made of porous sintered metal and supporting the slide member.

In this structure, the sintered metal density of the slide member is higher than that of the holding member, and both the members are impregnated with lubricating oil.

The present invention also provides a bearing device in which the particle diameter of the materials of the sintered metal used in the slide member is smaller than that of the holding member, and both the members are impregnated with the lubricating oil.

According to the bearing device constructed as above, sufficient lubricating oil can be retained, and is supplied continuously to the slide member that slides with respect to the rotational shaft. This structure can also prevent the lubricating oil from splashing out, thereby improving the abrasion-resistance. As a result, the above structure can realize a long-life bearing device. The present invention does not require any changes in the cubic volume or axial length of the slide member, as have been required by the prior art.

DESCRIPTION OF THE PREFERRED EMBODIMENTS

The embodiments of the present invention are described hereinafter by referring to the attached drawings.

Exemplary Embodiment 1

Figure 1:
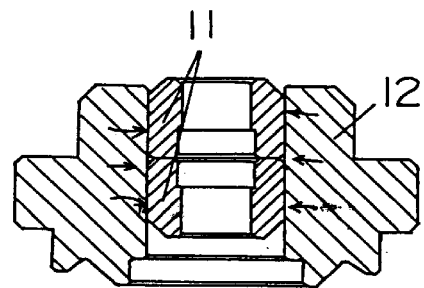
FIG. 1 is a cross sectional view of a bearing device used in a first exemplary embodiment of the present invention.

FIG. 1 is a cross sectional view of a bearing device used in a first exemplary embodiment of the present invention. In FIG. 1, a slide member 11 is made of porous sintered metal and shaped in a cylinder, and a cylindrical shaft-hole is punched through within a rim of the cylinder. The shaft-hole receives a rotational shaft (not shown) and supports it so that the shaft can be rotated in the circumferential direction. The shaft is thus supported rotatively within the slide member 11. The slide member 11 is press fitted into a holding member 12 made of the porous sintered metal, and the slide member is fixed into the holding member 12.

The slide member 11, in further detail, is provided as follows.

(1) Prepare two sub-slide-members, each having two different diameters, one small and the other slightly larger.

(2) Arrange the two sub-slide-members axially so that the diameter of both ends is smaller than that of the center part when the two sub-members are viewed as one entire slide member. Both ends slide with respect to the shaft.

(3) Both the slide member and the holding member are impregnated with lubricating oil in advance.

(4) A higher density material is used for the slide member 11 than for the holding member, so that hole sizes of the porous material differ between the two members. Lubricating oil can thus be continuously supplied from the holding member 12 to the slide member 11 due to the capillary phenomenon.

Both the ends that slide with the shaft are thus always filled with lubricating oil. As a result, the abrasion resistance of the part sliding with the shaft is improved, and a long-life bearing device is realized. Arrow marks in FIG. 1 indicate flow directions of the lubricating oil.

More specifically, a desirable condition of each member 11 and 12 is as follows:

Material: the same metal, an e.g. oil-retaining metal of the copper system

Density: slide member=6.5 g/cm$^3$ holding member=6.37 g/cm$^3$

Under these conditions, the lubricating oil can be retained and supplied in a preferable manner. However, when the density of the holding member 12 lowers to 6.18 g/cm$^3$, the sizes of porous holes become larger, which decreases the lubricating oil retaining ability. In other words, as long as the density ratio of the slide member 11 vs. the holding member 12 is kept between 1.0 and 1.05, an excellent ability to retain and supply the lubricating oil is assured. As a result, a long life bearing device can be realized.

Using the same metal for both the members prevents a failure of the supply of lubricating oil. When different metals are used, this failure is caused by subtle differences between the metals because of the wetting properties of each metal, and the like. The fact of using the same metal benefits the bearing device of the present invention to achieve a high reliability.

The slide member 11 comprises two sub-members in this embodiment; however, the member 11 can comprise one sub-member, three sub-members or more. When at least two sub-members, of which the axial lengths are short, are combined to form the slide member 11, at least two parts sliding with the shaft are produced, and still the same effect as in the above embodiment is expected.

Exemplary Embodiment 2

Figure 2:
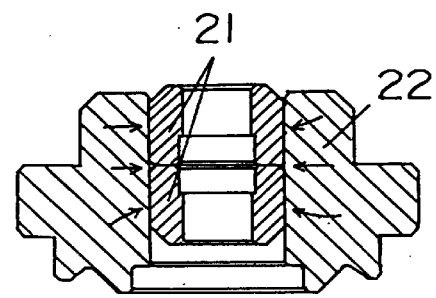
FIG. 2 is a cross sectional view of a bearing device used in a second exemplary embodiment of the present invention.

FIG. 2 is a cross sectional view of a bearing device used in a second exemplary embodiment of the present invention. In FIG. 2, a slide member 21 is made of porous sintered metal and shaped in a cylinder, and a cylindrical shaft-hole is punched through within a rim of the cylinder. The shaft-hole receives a rotational shaft (not shown) and supports it so that the shaft can be rotated in the circumferential direction. The shaft is thus supported rotatively within the slide member 21. The slide member 21 is press fitted into a holding member 22 that is made of the porous sintered metal to fix it in the holding member 22. Two short sub-slide-members are axially arranged to form the slide member 21, as in the first exemplary embodiment. The slide member 21 and the holding member 22 are impregnated with lubricating oil in advance.

In the bearing device constructed as above, the particle diameter of the materials used in the slide member 21 is smaller than that of the holding member 22, thereby making different sizes of porous holes between the two members. Lubricating oil can thus be continuously supplied from the holding member 22 to the slide member 21 due to the capillary phenomenon.

The parts sliding with the shaft are thus always filled with lubricating oil. As a result, the abrasion resistance of the parts sliding with the shaft is improved and a long-life bearing device is realized. Arrow marks in FIG. 2 indicate flow directions of the lubricating oil.

The slide member 21 is constructed by two sub-slide-members in this embodiment; however, the member 21 can comprise one sub-member, three-sub-members or more.

Exemplary Embodiment 3

Figure 3:
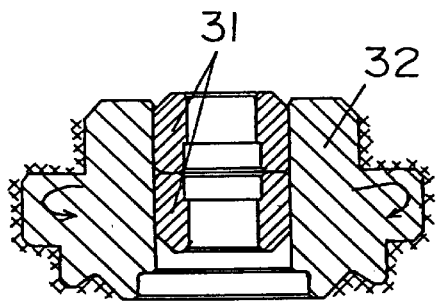
FIG. 3 is a cross sectional view of a bearing device used in a third exemplary embodiment of the present invention.

FIG. 3 is a cross sectional view of a bearing device used in a third exemplary embodiment of the present invention. In FIG. 3, a slide member 31 is made of porous sintered metal and shaped in a cylinder, and a cylindrical shaft-hole is punched through within a rim of the cylinder. The shaft-hole receives a rotational shaft (not shown) and supports it so that the shaft can be rotated in the circumferential direction. The shaft is thus rotatively supported within the slide member 31. The slide member 31 is press fitted into a holding member 32 made of the porous sintered metal, and the slide member 31 is thus fixed into the holding member 32. The slide member 31 and the holding member 32 are impregnated with lubricating oil in advance.

In the this third exemplary embodiment, an outer surface of the holding member 32 is glazed or processed by barrel finishing, whereby the porous property on the outer surface is destroyed. This process reinforces the prevention of the lubricating oil from flowing out of the holding member 32, and contributes to further extending the life of the bearing device. Marks of "x" in FIG. 3 indicate that glazing or barrel finishing is provided, and arrow marks indicate the flow of lubricating oil.

The slide member 31 is constructed by two sub-members in this embodiment; however, the member 31 can comprise one sub-member, three sub-members or more.

Exemplary Embodiment 4

Figure 4:
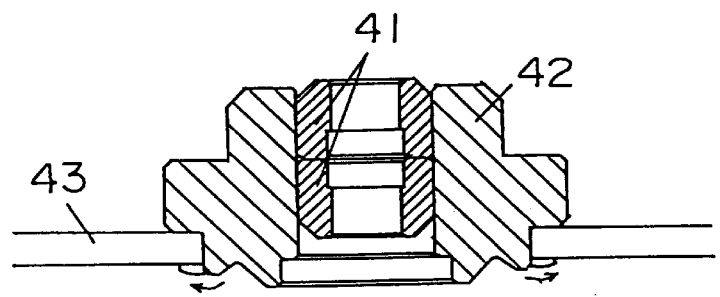
FIG. 4 is a cross sectional view of a bearing device used in a fourth exemplary embodiment of the present invention.
Figure 5:
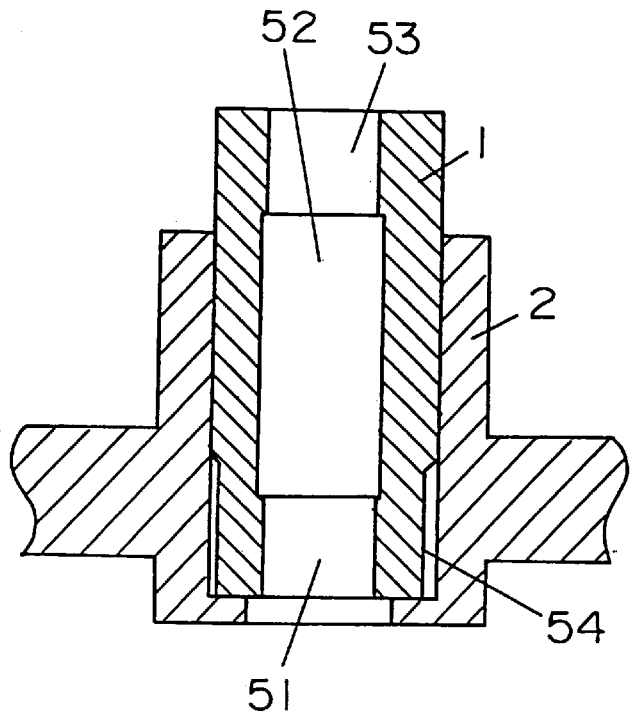
FIG. 5 is a cross sectional view of a conventional bearing device.
Figure 6:
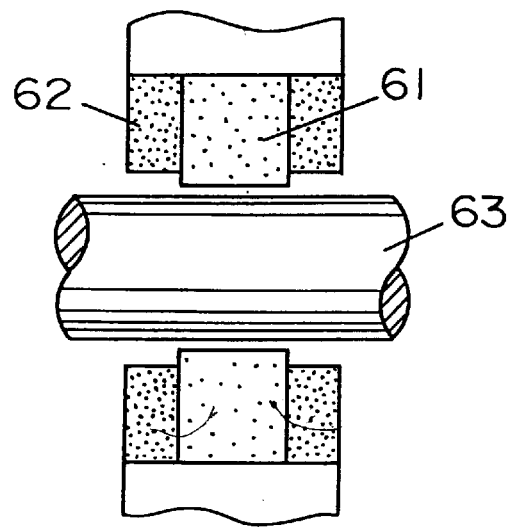
FIG. 6 is a cross sectional view of another conventional bearing device.

FIG. 4 is a cross sectional view of a bearing device used in a fourth exemplary embodiment of the present invention. In FIG. 4, a slide member 41 is made of porous sintered metal and shaped in a cylinder, and a cylindrical shaft-hole is punched through within a rim of the cylinder. The shaft-hole receives a rotational shaft (not shown) and supports it so that the shaft can be rotated in the circumferential direction. The shaft is thus rotatively supported within the slide member 41. The slide member 41 is press fitted into a holding member 42 made of the porous sintered metal, and the slide member 31 is thus fixed into the holding member 42. The slide member 41 and the holding member 42 are impregnated with lubricating oil in advance.

In this fourth exemplary embodiment, the holding member 42 is directly fixed to a bracket 43 or the like by caulking, thereby incorporating the slide member 41, holding member 42 and bracket 43 into one unit, which results in a long-life bearing device without enlarging its body. This is an advantageous effect of this exemplary embodiment. Arrow marks in FIG. 4 indicate the fixing of the holding member 42 to the bracket 43 by caulking.

The slide member 41 is constructed by two sub-members in this embodiment; however, the member 41 can comprise one sub-member, three sub-members or more.

As the above embodiments prove, the bearing device of the present invention comprises: (a) a slide member made of porous sintered metal for slidably supporting a rotational shaft, and (b) a holding member made of the same porous sintered metal and holding the slide member. The material density of the sintered metal of the slide member is greater than that of the holding member, or a particle diameter of materials of the sintered metal used in the slide member is smaller than that of the holding member. Both the members are impregnated with lubricating oil. This structure allows the bearing device to be small, to retain sufficient lubricating oil and to supply the lubricating oil continuously to the slide member, which results in improving abrasion resistance. As a result, a long-life bearing device is realized.

Further, the porous property of the outer surface of the holding member is destroyed by glazing or barrel finishing, thereby reinforcing the prevention of the lubricating oil from flowing out. This process can further extend the life of the bearing device.

Still further, when the same metal is used in both the members, a failure of supplying the lubricating oil is prevented. If different metals are used in the members, subtle differences between the two metals, such as their wetting property and the like, would cause this failure. As a result, a high reliability is obtained.

The advantages mentioned above assure that the bearing device of the present invention can retain sufficient lubricating oil and supply the lubricating oil continuously to the slide member, whereby a long-life bearing device is realized.

Spindle motors employing the bearing device of the present invention can be used in various disc driving apparatus for such as magnetic discs, optical discs, CD-ROMs, MDs, DVDs and others, and also, in apparatuses other than the disc driving apparatuses. Thus the present invention has a great industrial advantage.

Further, the bearing device of the present invention can be employed not only in bearing parts of motors, but also bearing parts of capstan-shafts that are rotated by a motor-driving-force transferred via belts and gears. As such, the bearing device of the present invention can be used in various kinds of bearings other than those of the motors.

Although illustrated and described herein with reference to certain specific embodiments, the present invention is not intended to be limited to the details shown. Rather, various modifications may be made in the details within the scope and range of the invention.

What is claimed is:

1. A bearing device comprising:

(a) a slide member made of porous sintered metal for slidably supporting a rotational shaft, and (b) a holding member made of porous sintered metal holding said slide member, wherein a density of the sintered metal of said slide member is greater than that of said holding member, wherein both said slide member and said holding member are impregnated with lubricating oil, and wherein the porous property of said holding member is destroyed on the outer surface of said holding member.

2. The bearing device as defined in claim 1, wherein said slide member comprises at least one sub-member.

3. The bearing device as defined in claim 1, wherein said slide member has not less than two parts for slidable engagement with a rotational shaft.

4. The bearing device as defined in claim 1, wherein said holding member is fixed to a bracket by caulking.

5. The bearing device as defined in claim 1, wherein said slide member comprises at least two sub-members, each of said sub-members has a shaft-hole that receives a rotational shaft, each said shaft-hole has a first part and a second part, a diameter of the first part is smaller than that of the second part, and wherein said sub-members are fixed in said holding member inside a rim of said holding member so that said first part can slide with respect to said rotational shaft.

6. A bearing device comprising:

(a) a slide member made of porous sintered metal for slidably supporting a rotational shaft, and (b) a holding member made of porous sintered metal holding said slide member, wherein the sintered metal used in said slide member has a particle diameter of a smaller value than that of said holding member, wherein both said slide member and said holding member are impregnated with lubricating oil, and wherein the porous property of said holding member is destroyed on the outer surface of said holding member.

7. The bearing device as defined in claim 6, wherein said slide member comprises at least one sub-member.

8. The bearing device as defined in claim 6, wherein said slide member has not less than two parts for slidable engagement with a rotational shaft.

9. The bearing device as defined in claim 6, wherein said holding member is fixed to a bracket by caulking.

10. The bearing device as defined in claim 6, wherein said slide member comprises at least two sub-members, each of said sub-members has a shaft-hole that receives a rotational shaft, each said shaft-hole has a first part and a second part, a diameter of the first part is smaller than that of the second part, and wherein said sub-members are fixed in said holding member inside a rim of said holding member so that said first part can slide with respect to said rotational shaft.

* * * * *